United States Patent
Kunda et al.

(10) Patent No.: US 7,228,745 B2
(45) Date of Patent: Jun. 12, 2007

(54) PRESSURE SENSOR

(75) Inventors: Tomohito Kunda, Okazaki (JP);
 Osamu Ito, Anjo (JP); Yoshifumi Murakami, Obu (JP); Takeshi Shinoda, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/220,534

(22) Filed: Sep. 8, 2005

(65) Prior Publication Data

US 2006/0053894 A1 Mar. 16, 2006

(30) Foreign Application Priority Data

Sep. 16, 2004 (JP) ............................. 2004-269541
Jan. 12, 2005 (JP) ............................. 2005-005327

(51) Int. Cl.
 *G01L 9/00* (2006.01)

(52) U.S. Cl. ....................................................... 73/754

(58) Field of Classification Search ................. 73/715, 73/700, 723, 754
See application file for complete search history.

(56) References Cited

U.S. PATENT DOCUMENTS 4,909,083 A * 3/1990 Fazeli et al. .................. 73/706

FOREIGN PATENT DOCUMENTS

| EP | 1 118 849 B1 | 8/2002 |
|---|---|---|
| JP | A-2000-131172 | 5/2000 |
| JP | A-2002-168716 | 6/2002 |
| JP | A-2004-45216 | 2/2004 |

* cited by examiner

*Primary Examiner*—Andre J. Allen
(74) *Attorney, Agent, or Firm*—Posz Law Group, PLC

(57) ABSTRACT

A pressure sensor includes a hollow cylindrical stem, a sensor chip, and a wiring board. The hollow cylindrical stem has a pressure-sensitive flexible diaphragm at a first axial end thereof and an opening at a second axial end thereof, the opening for transmitting pressure into the stem. The sensor chip is provided on the diaphragm for outputting an electrical signal in proportion to the deformation of the diaphragm. The wiring board electrically connects the sensor chip to an external circuit. The wiring board is located around the sensor chip on the first axial end of the stem.

11 Claims, 10 Drawing Sheets

PRESSURE

PRESSURE SENSOR

CROSS REFERENCE TO RELATED APPLICATIONS

This application is based upon and claims the benefit of priority of Japanese Patent Application No. 2004-269541, filed on Sep. 16, 2004 and Japanese Patent Application No. 2005-5327, filed on Jan. 12, 2005, the contents of which are incorporated herein by reference.

FIELD OF THE INVENTION

The present invention relates to a pressure sensor having a hollow cylindrical stem with a pressure sensing diaphragm, a sensor chip that detects deformation of the diaphragm, and a wiring board for connecting the sensor chip to an external circuit.

BACKGROUND OF THE INVENTION

Pressure sensors having a hollow cylindrical metal stem and a sensing element that outputs an electrical signal in proportion to detected pressure are generally known. Such a pressure sensor is disclosed, for example, in Japanese Patent Laid-Open Publication No. 2001-272297.

In the pressure sensor shown in this publication, a flexible diaphragm formed at one axial end of the stem is deformed by pressure transmitted into the hollow part of the stem through an opening that is provided at the other axial end of the stem.

A sensor chip provided on the diaphragm outputs an electrical signal in proportion to the deformation of the diaphragm.

The sensor chip is electrically connected to a wiring board, which is arranged outside the outer circumference of the stem or beyond the perimeter of the stem. The sensor chip is thus electrically connected to an external circuit through the wiring board so that the signal from the sensor chip is output thereto or to another external device.

In this sensor, the wiring board includes a circuit chip for processing the electrical signal from the sensor chip. The signal from the sensor chip is, for example, amplified or converted into a signal that is easier to handle by a processing circuit in this circuit chip before being output.

This type of pressure sensor is usually used for brakes. The sensor was conventionally mounted on an actuator for size reduction of the actuator. Now there is a demand to integrate the pressure sensor with an electromagnetic valve that is also mounted on the actuator in order to reduce the size of the actuator for further saving of space.

When integrating such a pressure sensor with an electromagnetic valve, usually, the valve is axially connected to the stem of the pressure sensor. The electromagnetic valve generally includes a pressure path inside for a pressurized medium to flow in, and a magnetic-driven valve, such as a solenoid, for controlling the flow rate of the pressurized medium in the path.

The pressure is thus controlled by the electromagnetic valve and applied to the diaphragm at one axial end of the stem of the pressure sensor through the opening at the other end. The sensor chip outputs an electrical signal in proportion to the pressure-induced deformation of the diaphragm, whereby pressure sensing is achieved.

Usually, the pressure sensor is inserted in a tubular solenoid, and the electromagnetic valve is driven by magnetic force from the solenoid for the pressure sensing.

Therefore, there is a need to reduce the diameter of the pressure sensor, i.e., of the stem in the sensor. To integrate the sensor with the electromagnetic valve, the sensor diameter (or the stem diameter) must be reduced to at least about 7.5 mm.

However, the radial dimension of the conventional pressure sensor disclosed in the above-identified publication is relatively large because it includes the area for the wiring board that is located outside the perimeter of the stem.

Furthermore, because of a circuit chip that is usually mounted on the wiring board as with this conventional sensor, the size of the wiring board is accordingly large as it includes the mounting area for the circuit chip.

SUMMARY OF THE INVENTION

In view of the above-identified and other problems with conventional techniques, an embodiment of the present invention includes a reduced diameter pressure sensor having a hollow cylindrical stem with a pressure sensing diaphragm, a sensor chip that detects deformation of the diaphragm, and a wiring board for electrically connecting the sensor chip to an external circuit.

According to one aspect of the present invention, the pressure sensor includes a hollow cylindrical stem, a sensor chip, and a wiring board. The hollow cylindrical stem includes a pressure-sensitive flexible diaphragm disposed at a first axial end thereof and an opening at a second axial end thereof, the opening allowing for a transmission of pressure into the stem. The sensor chip is provided on the diaphragm for outputting an electrical signal in proportion to a deformation of the diaphragm. The wiring board electrically connects the sensor chip to an external circuit and is located around the sensor chip on the first axial end of the stem.

As the sensor chip and the wiring board are both mounted on the axial end of the stem, the radial dimension of the pressure sensor is substantially reduced as compared to the conventional sensor structure wherein the wiring board is located outside the perimeter of the stem.

Therefore, according to this aspect of the present invention, the pressure sensor, which includes a hollow cylindrical stem with a pressure sensing diaphragm, a sensor chip for detecting deformation of the diaphragm, and a wiring board for electrically connecting the sensor chip to an external circuit, is substantially reduced in diameter.

According to a second aspect of the invention, the wiring board fits within the outside diameter of the stem to ensure reduction of the diameter of the sensor.

According to a third aspect of the invention, the pressure sensor further includes a circuit chip for processing the electrical signal from the sensor chip. In this case, the circuit chip is mounted upon the sensor chip on the first axial end of the stem and is electrically connected to the sensor chip and to the wiring board through bumps.

In one embodiment of the invention wherein the pressure sensor includes a circuit chip for processing the electrical signal from the sensor chip, the circuit chip is mounted on the sensor chip and connected thereto through bumps. Since the circuit chip is also mounted axially on the stem, the provision of the circuit chip does not hinder the reduction of the diameter of the pressure sensor.

According to a fourth aspect of the invention, the circuit chip includes a larger area than the sensor chip. The center of the circuit chip overlaps the sensor chip and its periphery overlaps the wiring board.

According to a fifth aspect of the invention, the sensor chip and the circuit chip mounted thereon are both square and offset from each other such that the corners of one chip protrude from the sides of the other chip.

This layout utilizes the fact that the diagonal of chips, which are usually square, is longer than the sides. That is, by overlapping one chip on the other such that the corners of one chip protrude from the sides of the other chip, the circuit chip has some peripheral regions that do not overlap the sensor chip, where it can be electrically connected to the wiring board by the bumps.

This allows the size of the circuit chip to be reduced to a minimum possible level, and yet the electrical connection between the chips can be established appropriately.

According to a sixth aspect of the invention, the sensor chip and the circuit chip are both square, and the circuit chip is connected to the sensor chip via the bump along one side, while it is connected to the wiring board via the bump along the opposite side.

With this arrangement, the degree of flatness required for reliable connection between the sensor chip, the circuit chip, and the wiring board is made relatively lower, and the electrical connection is established stably.

According to a seventh aspect of the present invention, the sensor chip and the circuit chip mounted thereon include pads on their opposing faces that are to be connected via the bumps. In one embodiment, one chip includes a plurality of pads corresponding to each one pad on the other chip. These plurality of pads on the one chip are arranged adjacent each other to be connected to each one pad on the other chip via the bumps.

This arrangement accommodates misalignments between the sensor chip and the circuit chip. For example, even when one is mounted offset from the other, their pads can still be connected appropriately through the bumps.

According to an eighth aspect of the present invention, the pressure sensor includes a flexible printed circuit board interposed between the circuit chip and the sensor chip and between the circuit chip and the wiring board. The circuit chip and the flexible printed circuit board, the flexible printed circuit board and the sensor chip, and the flexible printed circuit board and the wiring board, are electrically connected through the bumps.

With this arrangement, the flexibility of the flexible printed circuit board absorbs the stress applied between the circuit chip, the sensor chip, and the wiring board that are connected via the bumps.

According to a ninth aspect of the present invention, the wiring board is a plastic substrate, and part of the wiring board is interposed between the sensor chip and the stem so that the sensor chip and the wiring board are joined to the stem through thermal press bonding of the plastic substrate.

With this arrangement, the wiring board also functions as a bonding material to join itself and the sensor chip with the stem.

A separate bonding material for joining the wiring board and the sensor chip with the stem is thus made unnecessary, whereby the number of components is reduced and the manufacturing process is simplified.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIGS. 4A to 4C are plan views of a third modification of the layout of the pressure sensor of the first embodiment, wherein FIG. 4A illustrates an aligned position of chips of the pressure sensor, FIG. 4B illustrates a state in which the chips are angularly displaced by 30°, and FIG. 4C illustrates a state in which the chips are angularly displaced by 60°;

DETAILED DESCRIPTION OF THE PREFERRED EMBODIMENTS

Embodiments of the present invention will now be described with reference to the drawings.

The following embodiments of the pressure sensors are used, for example, for sensing the pressure of brake oil in an automobile brake system, or for sensing the pressure in a fuel pipe of an automobile fuel injection system.

Same or similar elements of the various embodiments below are given the same reference numerals in the drawings for ease of description.

First Embodiment

Figure 1A:
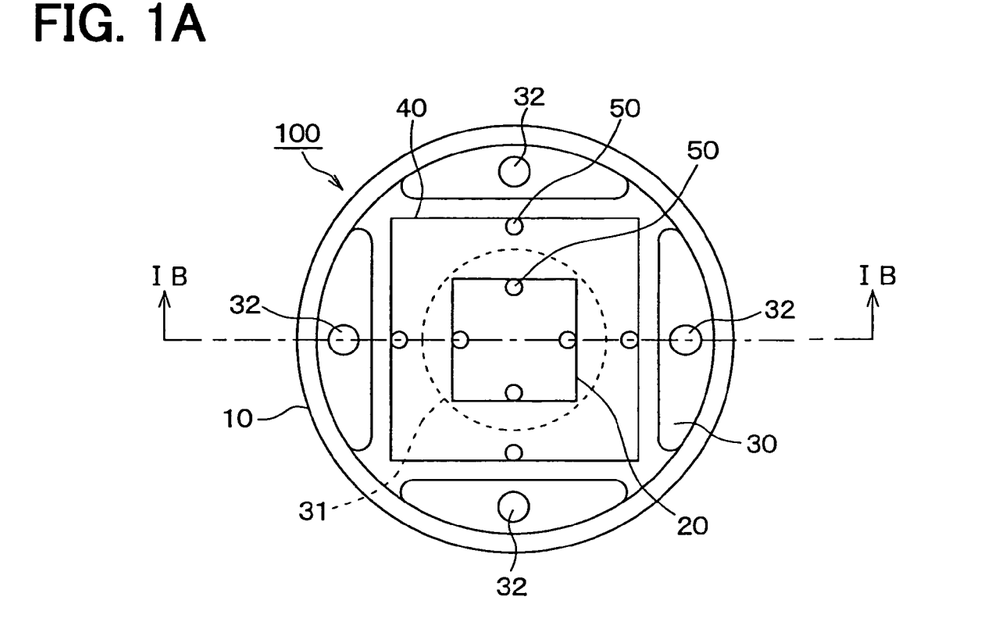
FIG. 1A is a top view of a layout of a pressure sensor according to a first embodiment of the present invention.
Figure 1B:
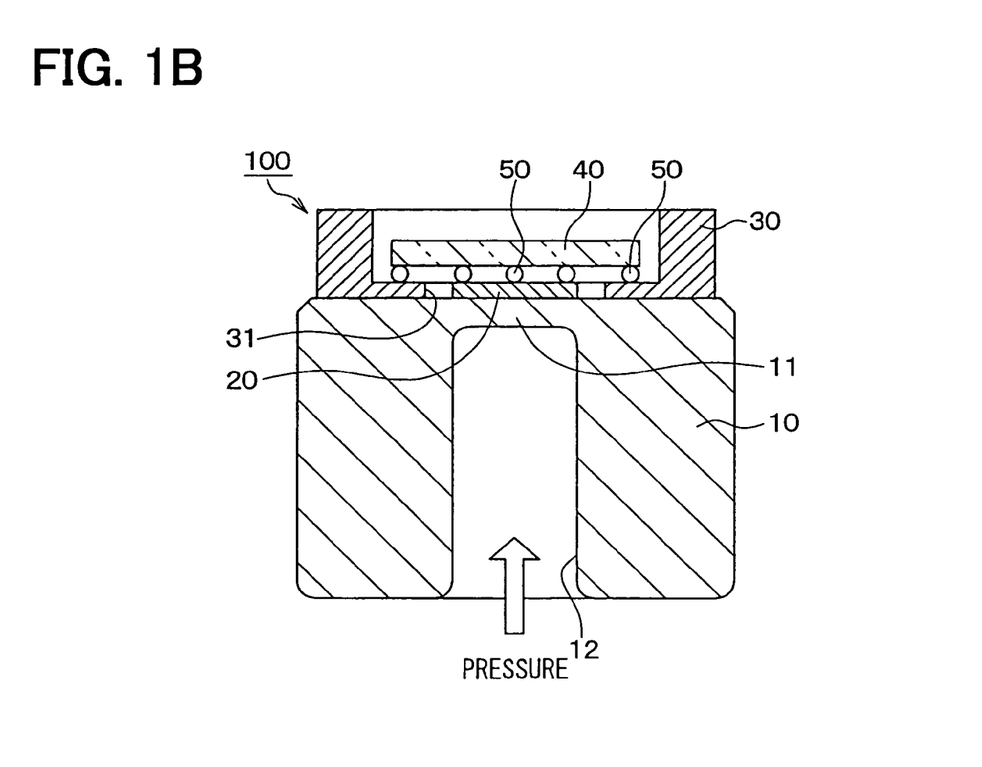
FIG. 1B is a cross-sectional side view of the pressure sensor of the first embodiment of the present invention taken along line IB—IB in FIG. 1A.

FIG. 1A and FIG. 1B illustrate a pressure sensor 100 according to a first embodiment of the invention. FIG. 1A is a top view and FIG. 1B is a longitudinal cross section taken along the line IA—IA in FIG. 1A. In FIG. 1A, a sensor chip 20 and bumps 50 are drawn by solid lines, although they do not show because of the circuit chip 40.

As shown in FIG. 1B, a stem 10 includes a hollow cylinder. The stem 10 has a diaphragm 11 disposed at a first axial end thereof and an opening 12 at a second axial end thereof. Pressure is transmitted into the hollow part via the opening 12. The diaphragm 11 is deformed by the pressure.

The diaphragm 11 is formed by providing a thin part in the end face at the first axial end of the stem 10. The stem 10 is mounted to an electromagnetic valve (not shown) in a sealed manner at a portion on the side of the opening 12.

The electromagnetic valve includes a flow path inside for a pressurized medium and a valve for controlling the flow rate of the medium through the path. The pressure is adjusted by the electromagnetic valve and transmitted through the opening 12 into the stem 10, where it is to be measured.

The pressure transmitted into the hollow part of the stem 10 is applied to the diaphragm 11, which deforms in proportion to the degree of applied pressure.

As shown in FIG. 1A and FIG. 1B, a sensor chip 20 is provided on the diaphragm 11 of the stem 10. The sensor chip 20 outputs an electrical signal in proportion to the deformation of the diaphragm 11.

The sensor chip 20 is a semiconductor chip made of, for example, a single crystal silicon, and the example shown in the drawings has a square shape. The sensor chip 20 is securely bonded to the diaphragm 11 of the stem 10 using low-melting point glass (not shown) or the like.

More specifically, the sensor chip 20 has a bridge circuit and functions as a strain gauge, which outputs an electrical signal indicative of the changes in resistance in proportion to the deformation of the diaphragm 11 caused by the pressure transmitted through the opening 12. The basic performance of the pressure sensor 100 depends largely on the diaphragm 11 and the sensor chip 20.

The metal used for the stem 10 has a high strength to withstand high pressure, and, a low thermal expansion coefficient because of the need to bond the silicon sensor chip 20 using glass, as noted above.

To be specific, the stem 10 is made of a material chiefly composed of Fe, Ni, and Co, or Fe and Ni with additives of Ti, Nb, and Al or Ti and Nb to enhance precipitation, and formed by any of pressing, cutting, cold-forging, or the like.

In this embodiment, a wiring board 30 is arranged around the sensor chip 20 on the end face of the stem 10. The wiring board 30 electrically connects the sensor chip 20 to an external circuit (not shown). The wiring board 30 is securely bonded to the stem 10 using glass or the like, similar to the bonding of the sensor chip 20.

As shown in FIG. 1A and FIG. 1B, the wiring board 30 is an annular substrate having a through hole 31 in the center. In this example, the wiring board 30 is of a size that fits within the outside radial diameter of the stem 10. The sensor chip 20 is disposed inside the through hole 31. The wiring board 30 thus rests on the axial end face of the stem 10 such as to surround the sensor chip 20.

The through hole 31 of the wiring board 30 need not necessarily be circular and may be square, polygonal, or any other shape that allows the sensor chip 20 to fit therein. The wiring board 30 need not be continuously annular and may have other shapes that can surround the sensor chip 20.

The wiring board 30 includes lands 32 for electrically connecting the pressure sensor 100 with an external wiring member (not shown) such as a circuit board or a bus bar. The lands 32 are formed of, for example, conductive metal paste, and, according to needs, plated with metal such as gold, silver, and copper.

In this example, four lands 32 are provided around the through hole 31 and used for discrete purposes, for example, for a power supply terminal, a grounding terminal, an output terminal, and an adjustment terminal of the pressure sensor 100.

The pressure sensor 100 is electrically connected to, for example, an ECU of an automobile through the external wiring member (not shown) electrically connected to these lands 32.

The wiring board 30 may be a ceramic substrate or a plastic substrate. In this example, a ceramic multilayer wiring board is used.

A plurality of ceramic layers are laminated on the board, and via holes, interlayer connection, and the lands 32 are formed using conductive paste such as tungsten (W) or molybdenum (Mo) to complete the wiring.

The wiring board 30 shown in FIG. 1A and FIG. 1B has peripheral side walls that stand higher than the sensor chip 20 and a circuit chip 40 so that the chips 20, 40 are accommodated inside the side walls of the wiring board 30.

This structure enables provision of protection of the chips 20 and 40, for example, with a lid attached to the top of the walls, or with a protective material such as gel or plastic filled in the space encircled by the walls. Furthermore, it should be appreciated that such side walls are not an absolute requirement for the wiring board 30.

The pressure sensor 100 includes the circuit chip 40 for processing an electrical signal from the sensor chip 20. The circuit chip 40 is an IC chip such as a silicon semiconductor chip formed with circuits through a number of processes.

As shown in FIG. 1A, the circuit chip 40 is placed upon the sensor chip 20 on the axial end face of the stem 10. The circuit chip 40 is electrically connected to the sensor chip 20 and to the wiring board 30 through bumps 50.

The circuit chip 40 has a larger area than the sensor chip 20. In this example, the circuit chip 40 is square, but this is not a requirement and the chip may be circular.

The center of the circuit chip 40 overlaps the sensor chip 20, while its periphery overlaps the wiring board 30. The chips 20 and 40, as well as the chip 40 and the board 30, are electrically connected to each other through bumps 50 in these overlapped portions.

The chips 20, 40 and the board 30 are thus electrically connected via the bumps 50, and the signal from the sensor chip 20 is, for example, amplified or converted into a signal that is easier to handle by a processing circuit in the circuit chip 40 before being output to the external circuit (not shown) from the wiring board 30.

The bumps 50 are, for example, solder bumps or gold bumps. Bump connection is achieved by solder bonding of the solder bumps or pressure bonding of the gold bumps.

The bumps 50 are formed by printing or plating on the sensor chip 20 and the wiring board 30 secured on the stem 10, after which the circuit chip 40 is mounted thereon for the bump connection.

Alternatively, the bumps 50 may be formed on the circuit chip 40 by similar methods, after which the circuit chip 40 is mounted on the sensor chip 20 and the wiring board 30 secured on the stem 10 for the bump connection.

Manufacturing Process and Operation

One example of a manufacturing process of this pressure sensor 100 will now be described.

First, the stem 10 is prepared, and the low-melting point glass mentioned in the foregoing is printed on the diaphragm 11 and its periphery at the axial end face of the stem 10. The sensor chip 20 and the wiring board 30 are then mounted on the stem.

The low-melting point glass is melted and cured so that the sensor chip 20 and the wiring board 30 are secured to the stem 10. More specifically, lead glass having a low melting point is printed on the stem 10 and fired for glass-bonding, and after the sensor chip 20 and the wiring board 30 have been mounted on the fired glass, it is fired again so that the chip 20 and the board 30 are joined to the stem 10 through the glass.

The bumps 50 are then provided by the method mentioned in the foregoing either on the sensor chip 20 and the wiring board 30 or on the circuit chip 40 for connecting the circuit chip 40 with the sensor chip 20 and the wiring board 30 by the bumps 50. The pressure sensor 100 shown in FIG. 1 is thus complete.

This pressure sensor 100 is inserted into a tubular solenoid for driving the electromagnetic valve so that the sensor is integrally attached to and connected to the electromagnetic valve for pressure detection.

The electromagnetic valve adjusts the flow rate of the pressure medium, and the pressure is transmitted into the hollow part of the stem 10 through its opening 12, whereby the diaphragm 11 is deformed.

The pressure sensing is performed as follows: The sensor chip 20 converts the deformation into an electrical signal, which is sent through the bumps 50 to the circuit chip 40, where it is amplified or adjusted before being outputted to an external circuit through the bumps 50 and the wiring board 30.

The signal indicative of detected pressure is used for the control of a brake system or a fuel injection system by an ECU or the like of an automobile.

Advantages

The above-described embodiment of the pressure sensor 100 includes a hollow cylindrical stem 10 having a pressure-sensitive flexible diaphragm 11 at an axial end and an opening 12 at the other axial end for transmitting pressure into the hollow part of the stem, a sensor chip 20 provided on the diaphragm 11 for outputting an electrical signal in proportion to the deformation of the diaphragm 11, and a wiring board 30 for electrically connecting the sensor chip 20 to an external circuit, the wiring board 30 being located around the sensor chip 20 on one axial end of the stem 10.

Because both the sensor chip 20 and the wiring board 30 are mounted upon one axial end of the stem 10, the diameter of the sensor is reduced in comparison to the conventional structure in which the wiring board 30 is mounted outside the perimeter of the stem 10.

Therefore, the pressure sensor 100, including a hollow cylindrical stem 10 with a pressure sensing diaphragm 11, a sensor chip 20 for detecting deformation of the diaphragm 11, and a wiring board 30 for electrically connecting the sensor chip 20 to an external circuit, is substantially reduced in diameter.

The pressure sensor 100 is inserted in a tubular solenoid for driving the electromagnetic valve so that it is integrally connected to the valve for pressure detection. Accordingly, the reduction in diameter of the pressure sensor 100 leads to size reduction of the electromagnetic valve with a sensor.

The pressure sensor 100 shown in FIG. 1A and FIG. 1B, in particular, has the wiring board 30 that fits within the outside diameter of the stem 10. Therefore, the radial dimension of the pressure sensor 100 including the wiring board 30 can be reduced to as small as the diameter of the stem 10.

This is of course not a requirement of the present invention, and the wiring board 30 may slightly extend beyond the outside diameter of the stem 10, as long as the pressure sensor 100 is slim enough to be inserted into the solenoid.

The circuit chip 40 for processing the electrical signal from the sensor chip 20 is mounted upon the sensor chip 20 at the axial end of the stem 10, and the circuit chip 40 is electrically connected to the sensor chip 20 and to the wiring board 30 through the bumps 50.

As the circuit chip 40 for processing the electrical signal from the sensor chip 20 is mounted upon the sensor chip 20 and connected thereto by the bumps 50, the circuit chip 40 also rests on the axial end of the stem 10 and does not extend radially, which would hinder the size reduction of the sensor.

In the example shown in FIG. 1A, as noted above, the circuit chip 40 has a larger area than the sensor chip 20, and the center of the circuit chip 40 overlaps the sensor chip 20, while its periphery overlaps the wiring board 30. The circuit chip 40 is electrically connected to the sensor chip 20 and to the wiring board 30 through the bumps 50 in these overlapped portions.

It should be appreciated that various modifications to this layout and arrangement of the circuit chip 40 and the bumps 50, as described above, are intended to be within the scope of the present invention, as will be described below.

Modifications to First Embodiment

FIGS. 2A to 4C illustrate various modifications made to the above-described embodiment. In the top views of these drawings, the sensor chip 20, bumps 50, through hole 31, and pads a, b, c, and d (in FIG. 4) are drawn by solid lines, although they do not show because of the circuit chip 40.

Figure 2A:
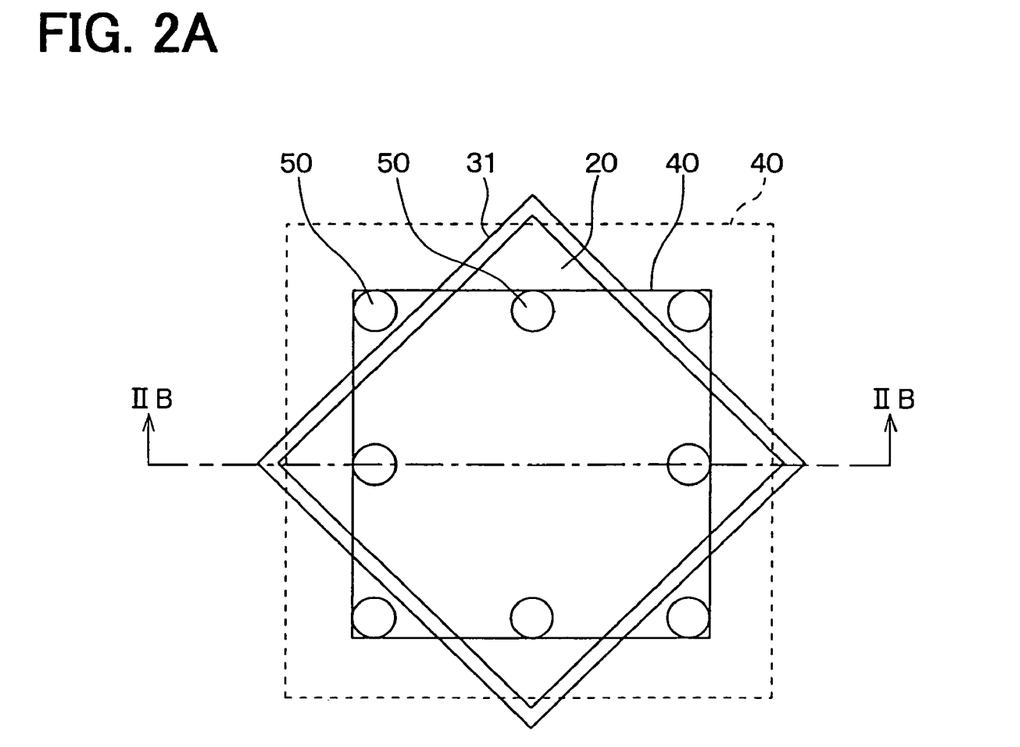
FIG. 2A is a plan view of a first modification of the layout of the pressure sensor of the first embodiment.
Figure 2B:
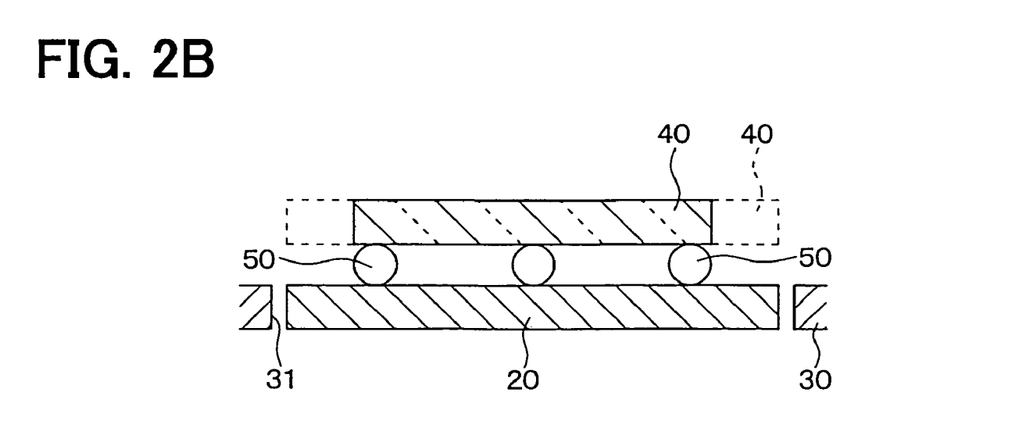
FIG. 2B is a cross-sectional side view of the first modification of the layout of the pressure sensor according to the first embodiment taken along line IIB—IIB of FIG. 2A.

FIG. 2A is a top view and FIG. 2B is a cross-sectional side view taken along the line IIB—IIB of FIG. 2A, illustrating one modification of the above-described embodiment, in which the layout of the circuit chip 40 and the bumps 50 is changed.

In this example, the sensor chip 20 and the circuit chip 40 are both square, and the circuit chip 40 is overlapped on the sensor chip 20 in an offset position so that the corners of one chip protrude from the sides of the other chip.

In the illustrated example, as compared to the layout shown in FIG. 1A, the chips are rotated from each other by 45 degrees around an axis in the direction in which they are overlapped.

Furthermore, while the chips 20 and 40 are rotated by 45 degrees in FIG. 2, it should be appreciated that they may be rotated by less than 45 degrees, as long as the corners of one chip protrude from the sides of the other chip.

In this first modification, the layout utilizes the fact that the diagonal of chips, which are usually square, is longer than the sides.

That is, even if the sensor chip 20 and the circuit chip 40 both have more or less the same area size, the circuit chip 40 has some peripheral regions that do not overlap the sensor chip 20 as shown in FIG. 2A, where it can be electrically connected to the wiring board 30 by the bumps 50.

Therefore, with this first modification, the square circuit chip 40 can be reduced to as small as the same size of the square sensor chip 20, and yet the electrical connection between the chips 40 and 20 can be established appropriately.

This example therefore improves size reduction of the circuit chip 40. The broken lines in FIG. 2A and FIG. 2B indicate the circuit chip 40 of the same size as that shown in FIG. 1A and FIG. 1B to show how much smaller the circuit chip 40 of this example is.

Alternatively, a larger sensor chip 20 may be used, i.e., the larger circuit chip 40 shown in FIG. 1A and a sensor chip 20 that is as large as this circuit chip may be used.

With the layout of the circuit chip 40 and the bumps 50 shown in FIG. 1A, a high degree of flatness is required for both chips before the bump bonding. Moreover, the bumps 50 may experience a large deflection (stress) depending on the combination of the materials for the chips.

Figure 3A:
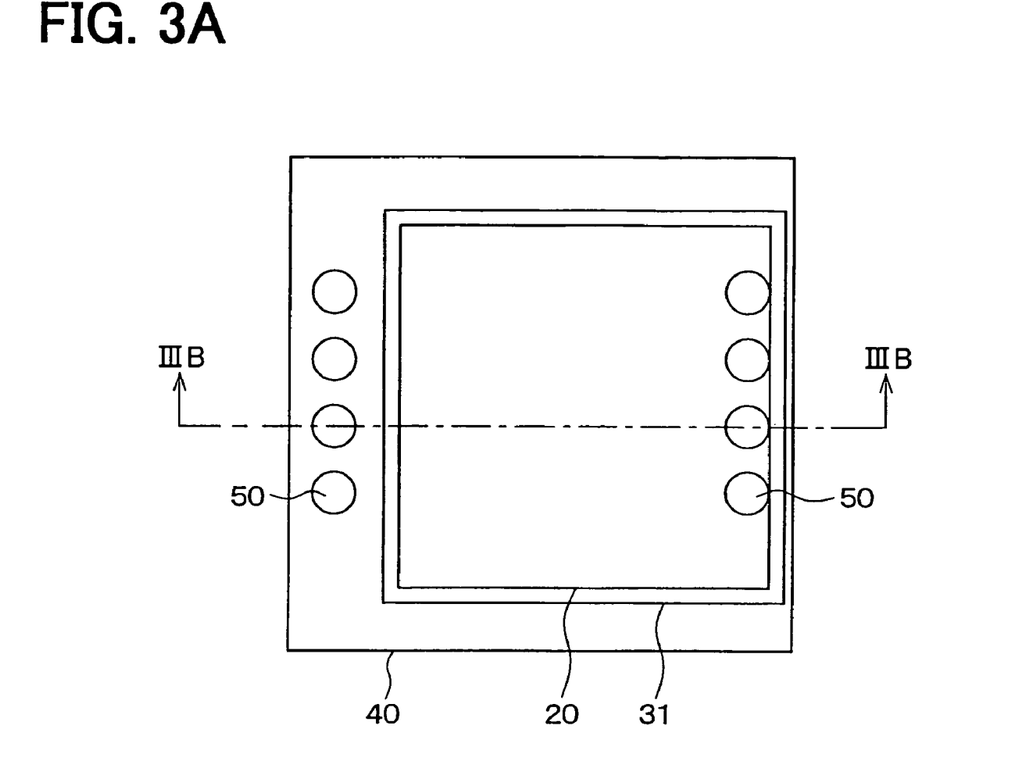
FIG. 3A is a plan view of a second modification of the layout of the pressure sensor of the first embodiment.
Figure 3B:
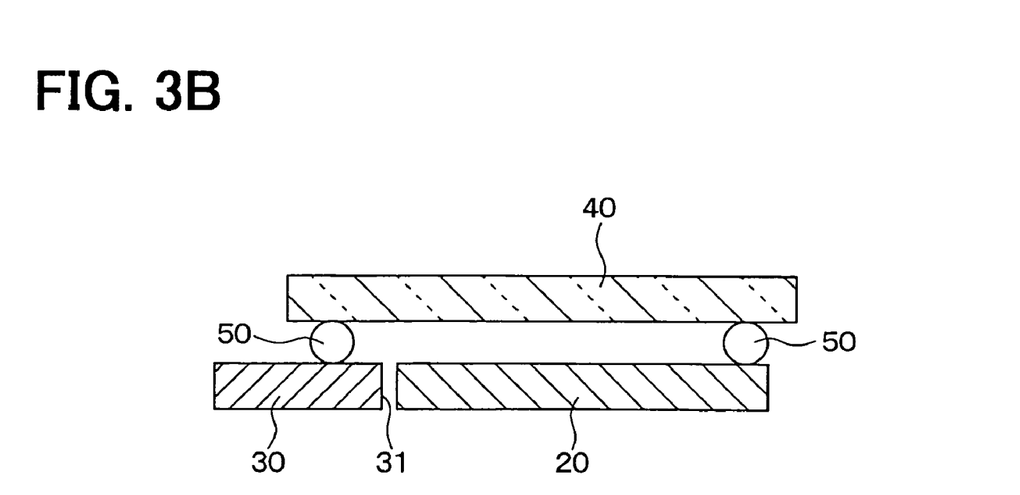
FIG. 3B is a cross-sectional side view of the second modification of the layout of the pressure sensor according to the first embodiment taken along line IIIB—IIIB of FIG. 3A.

FIG. 3A is a top view and FIG. 3B is a cross-sectional side view taken along line IIIB—IIIB of FIG. 3A, illustrating a second modification of the first embodiment, in which the layout of the circuit chip 40 and the bumps 50 is changed.

In this example, the sensor chip 20 and the circuit chip 40 are both square, and the circuit chip 40 is connected to the sensor chip 20 via the bumps 50 along one side, while it is connected to the wiring board 30 via the bumps 50 along the opposite side.

With this arrangement of the second modification, the degree of flatness required for the chip and the board is relatively lower and the deflection of the bumps 50 is mitigated, whereby the electrical connection between the sensor chip 20, the circuit chip 40, and the wiring board 30 is established reliably.

The sensor chip 20 and the circuit chip 40 overlapped thereon are connected via the bumps 50 on their opposing faces. Pads are provided in these opposing portions corresponding to the bumps 50.

The pads of the circuit chip 40 overlapped on the sensor chip 20 must be positioned precisely relative to the pads of the sensor chip 20 for successful bump connection.

If the pads on the opposing faces of the chips 20 and 40 are provided in pairs to be connected via bumps, even a slight misalignment between the chips may lead to connection failure.

Figure 4A:
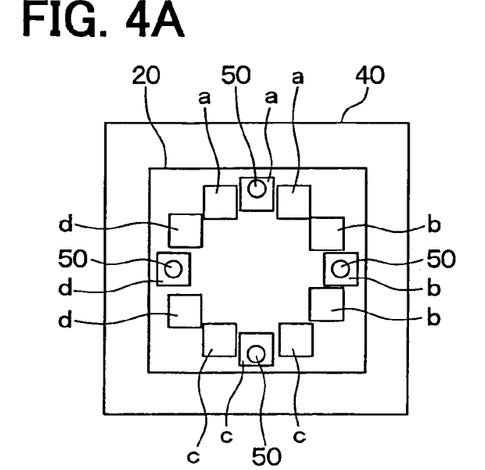
Figure 4B:
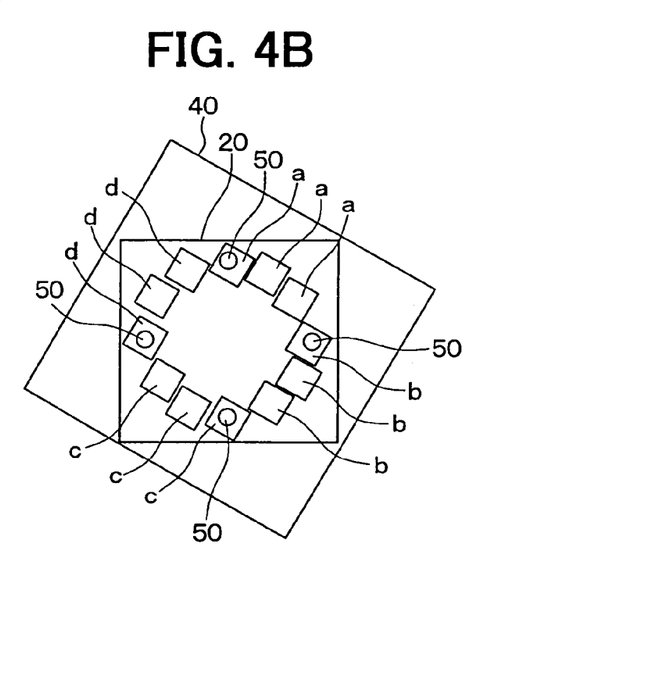
Figure 4C:
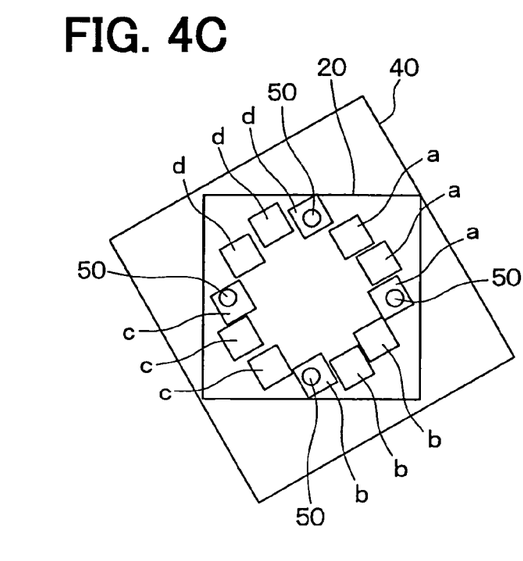

FIG. 4A to FIG. 4C are plan views illustrating a third modification to the layout of the circuit chip 40 and the bumps 50 to ensure alignment of the chips 20 and 40.

In this modification, bumps 50 are formed on the sensor chip 20 and the wiring board 30 that are secured on the stem 10, and the circuit chip 40 is mounted thereon for the bump connection.

In the illustrated example, four types of pads a, b, c, and d are provided on the circuit chip 40 mounted on the sensor chip 20, which are to be connected to four bumps 50 on the sensor chip 20.

More specifically, a plurality of pads are provided adjacent each other on the circuit chip 40 for each of the four types of pads a, b, c, and d that are to be connected with one bump 50 each on the sensor chip 20. In the illustrated example, three each of the four types of pads a, b, c, and d are provided adjacent each other on the circuit chip 40.

The twelve pads, i.e., three each of the four types of pads a, b, c, and d, are equally spaced in a substantially circular arrangement, as shown in the drawings. Therefore, this arrangement accommodates misalignments between the square sensor chip 20 and the circuit chip 40, when one is rotated around the center relative to the other.

FIG. 4A shows a state where both chips 20 and 40 are aligned. Even if the circuit chip 40 is rotated by 30°, as shown in FIG. 4B, or by 60°, as shown in FIG. 4C, the pads a, b, c, and d on the circuit chip 40 can be connected to the bumps 50 on the sensor chip 20.

In the illustrated example, the plurality of pads a, b, c, and d are provided on the circuit chip 40, because the chip 40 is mounted on the sensor chip 20 and the wiring board 30 that are secured on the stem 10 and formed with the bumps 50.

Alternatively, the bumps 50 may be pre-formed on the circuit chip 40. In that case, although not shown, the plurality of pads are provided on the sensor chip 20, and the circuit chip 40 with the bumps 50 is mounted on the sensor chip 20 and the wiring board 30.

That is, the pads a, b, c, and d illustrated in FIGS. 4A to 4C can also be formed on the sensor chip 20, in which case the bumps 50 are formed on the circuit chip 40.

In other words, the pads a, b, c, and d and the bumps 50 to be connected therewith are provided in the opposite faces of the sensor chip 20 and the circuit chip 40 mounted thereon, and a plurality of pads for each type are provided adjacent each other on one chip 40 corresponding to one each pad on the other chip 20 for bump connection.

With this layout, even when the circuit chip 40 is misaligned relative to the sensor chip 20 when it is mounted thereon, their pads a, b, c, and d are connected to each other through bumps 50 without failure. That is, this layout accommodates misalignments between the chips.

FIGS. 4A to 4C only show one example of the third modification, and the layout is not limited to this example. For example, the pads on one chip corresponding to one pad each on the other chip may be provided in any number, i.e., there may be two, or four or more pads on one chip for each pad on the other chip. The pads need not necessarily be arranged along a circle as illustrated, but may be placed suitably in proportion to the expected misalignment angles.

Second Embodiment

Figure 5:
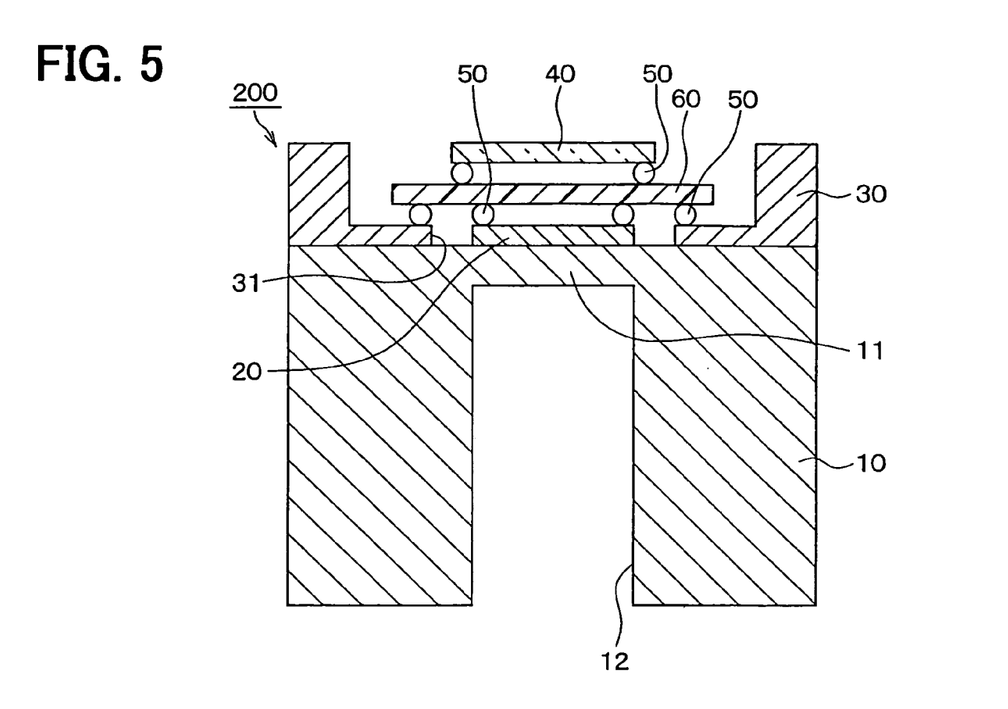
FIG. 5 is a cross-sectional side view of a pressure sensor according to a second embodiment of the present invention.

FIG. 5 is a cross-sectional side view of a second embodiment of the pressure sensor 200 according to the present invention. Only the distinguishing features from the previous embodiment will be described.

As shown, the pressure sensor 200 includes a flexible printed circuit board 60 interposed between the circuit chip 40 and the sensor chip 20 and between the circuit chip 40 and the wiring board 30. That is, a flexible printed circuit board 60 is added to the embodiment described in the foregoing.

The circuit chip 40 and the flexible printed circuit board 60, the board 60 and the sensor chip 20, and the board 60 and the wiring board 30, are electrically connected through bumps 50.

With this pressure sensor 200, the flexibility of the printed circuit board 60 absorbs the stress applied between the circuit chip 40, the sensor chip 20, and the wiring board 30 that are connected via the bumps 50.

Similarly to the previously described embodiment, this pressure sensor 200, including a hollow cylindrical stem 10 with a pressure sensing diaphragm 11, a sensor chip 20 for detecting deformation of the diaphragm 11, and a wiring board 30 for electrically connecting the sensor chip 20 to an external circuit, is substantially reduced in diameter.

Also, the reduction in diameter of the pressure sensor 200 leads to size reduction of the electromagnetic valve with an integrated sensor.

The various modifications of the above-described first embodiment are also applicable to this pressure sensor 200 with the flexible printed circuit board 60.

Third Embodiment

While the above-described embodiments of the pressure sensors include a circuit chip 40 for processing an electrical signal from the sensor chip 20, such circuit chip can be omitted depending on the case. For example, an integrated circuit in which the sensor chip and the processing circuit are integrated may be used instead of a separate sensor chip and a circuit chip.

Figure 6:
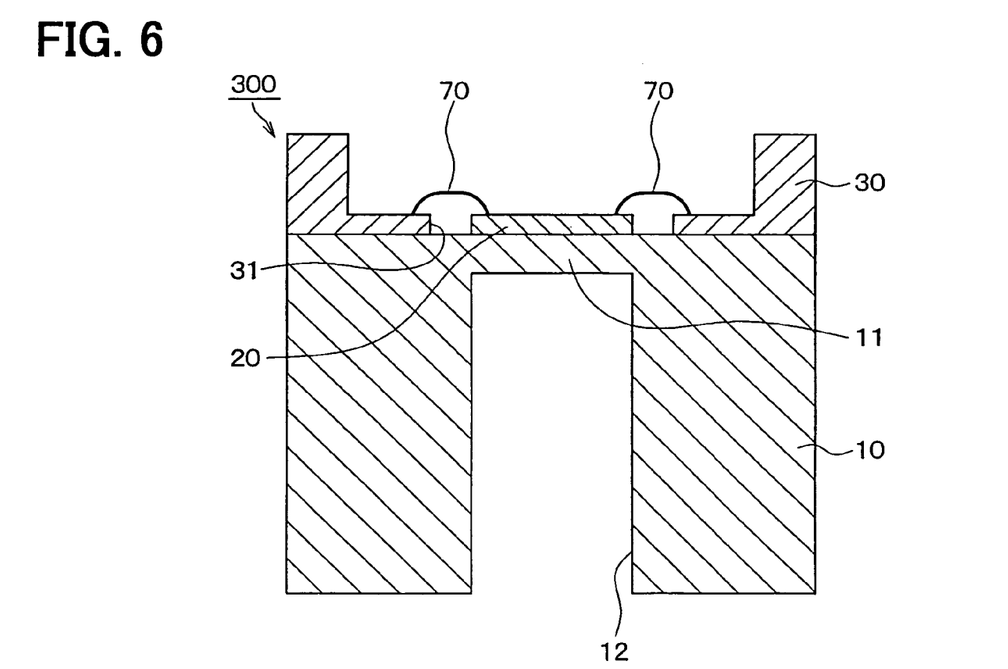
FIG. 6 is a cross-sectional side view of a pressure sensor according to a third embodiment of the present invention.

FIG. 6 is a cross-sectional side view of a third embodiment of the pressure sensor 300, in which an IC chip is used in place of a separate sensor chip and a circuit chip.

In this pressure sensor 300, the wiring board 30 and the IC sensor chip 20 are placed on the axial end face of the stem 10, and are electrically connected to each other using gold or aluminum bonding wires 70.

The pressure sensor 300 is produced through the process of bonding the sensor chip 20 and the wiring board 30 on the stem 10 and the wire bonding process performed thereafter to form the bonding wires 70.

Pressure is transmitted through the opening 12 into the hollow part of the stem 10. The IC sensor chip 20 converts the pressure-induced deformation of the diaphragm 11 into an electrical signal, and amplifies or adjusts the signal.

The electrical signal is sent to the wiring board 30 through the bonding wires 70 and outputted from the wiring board 30 to an external circuit for the pressure detection.

Thus this embodiment of the pressure sensor 300 also includes a stem 10 with a diaphragm 11 and an opening 12, a sensor chip 20 mounted on the diaphragm 11, and a wiring board 30, and the wiring board 30 is provided around the sensor chip 20 on one axial end face of the stem 10.

As the wiring board 30 is mounted axially on the stem 10, the pressure sensor 300 can be reduced in diameter, which in turn reduces the size of the electromagnetic valve in which the sensor 300 is mounted.

Fourth Embodiment

In the embodiments described in the foregoing, as shown in FIG. 1A, the wiring board 30 includes lands 32 for electrical connection between the pressure sensor 100 and an external wiring member such as a circuit substrate or a bus bar (not shown).

Pins on the external wiring member are connected to the lands 32 by soldering or contact to establish electrical connection.

One alternative would be to provide pins to the wiring board 30 and to connect these pins to the external wiring member by welding, soldering, or contact.

The fourth embodiment of the pressure sensor adopts this structure. That is, the wiring board 30 is modified, and other parts are substantially the same as those of the above-described embodiments.

Figure 7:
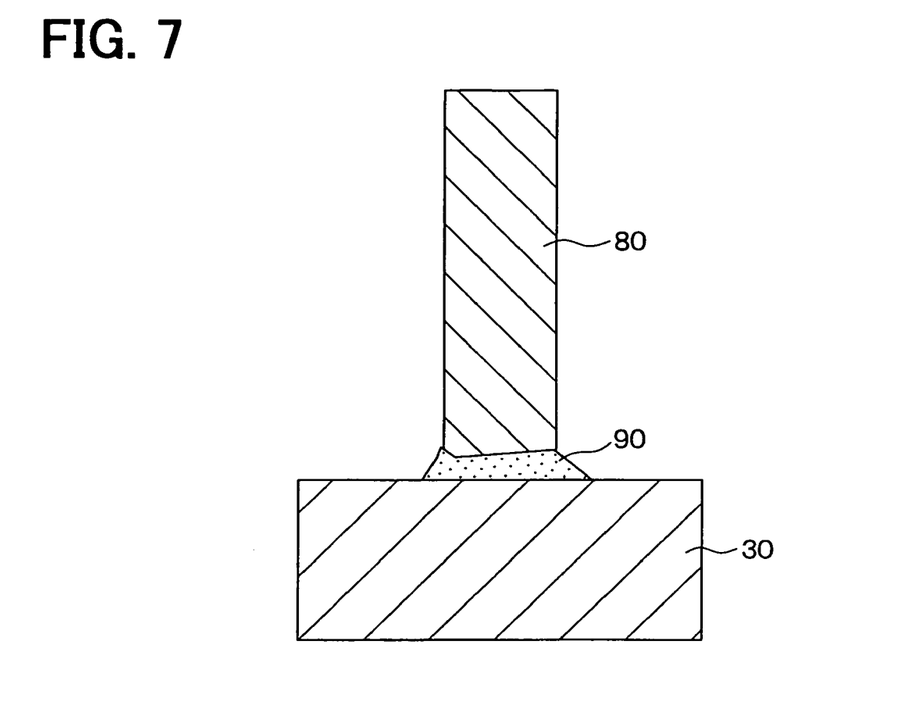
FIG. 7 is a cross-sectional side view of a wiring board with a pin soldered thereto according to the principles of the present invention.

Generally speaking, a pin 80 could be connected to a ceramic wiring board 30 using solder 90, as shown in FIG. 7. However, the soldering process to discrete wiring boards would be complicated and the cost would be high.

Figure 8:
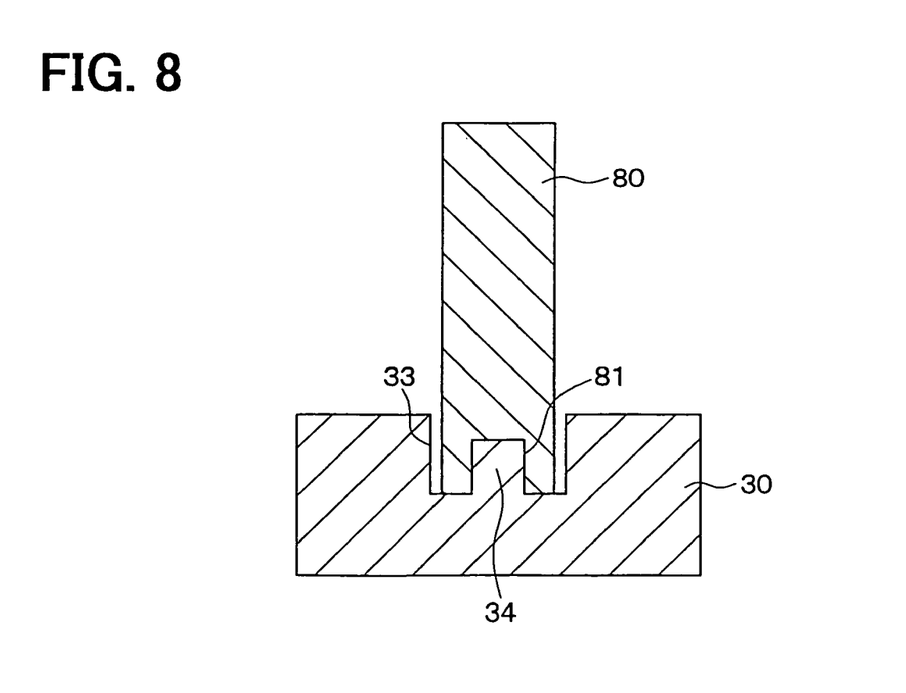
FIG. 8 is a cross-sectional side view of a wiring board with a pin coupled thereto according to the principles of the present invention.

FIG. 8 is a schematic cross section of the wiring board 30 and the pin 80 in a fourth embodiment joined to each other. The wiring board 30 is made of a ceramic material, such as alumina.

The pin 80 is formed of a conductive metal, such as copper or phosphoric bronze. It is columnar, with a groove 81 at one end that is connected to the wiring board 30. Correspondingly, the wiring board 30 is formed with a recess 33 for receiving the pin 80. A boss 34 that fits in the groove 81 is provided in the recess 33.

One end of the pin 80 is inserted into the recess 33 so that the boss 34 in the recess 33 fits in the groove 81, to securely retain the pin 80 on the wiring board 30.

Figure 9:
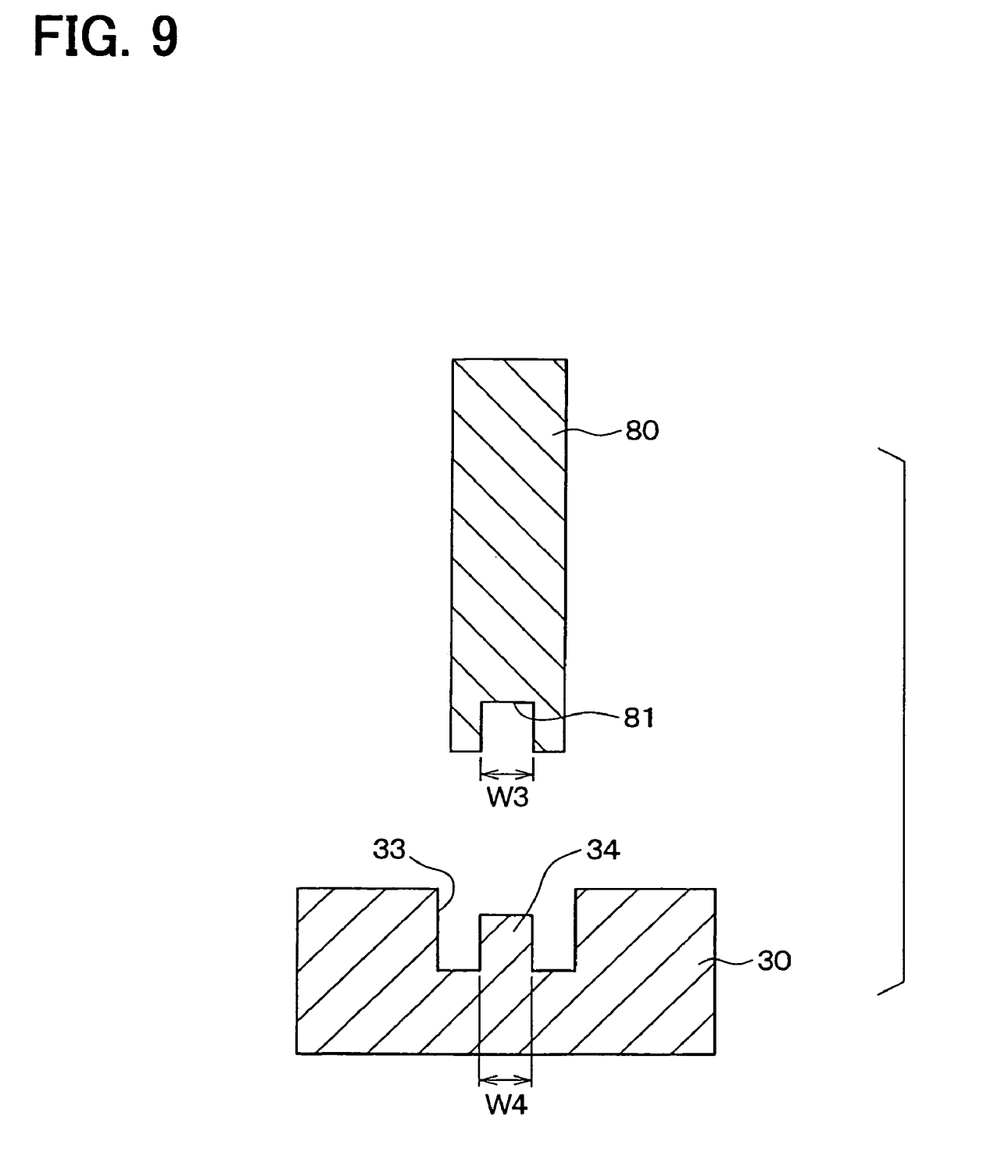
FIG. 9 is a cross-sectional side view of the wiring board and the pin of FIG. 8 decoupled.

FIG. 9 illustrates the pin 80 and the wiring board 30 before they are joined. The width w3 of the groove 81 of the pin 80 is slightly smaller than the width w4 of the boss 34 on the wiring board 30. The pin 80 is made of copper or phosphoric bronze as noted above in this embodiment and has a linear expansion coefficient of about 17 to 20 ppm/° C.

On the other hand, the ceramic wiring board 30 has a linear expansion coefficient of about 5 to 7 ppm/° C. Therefore, the width w3 of the groove 81 becomes larger than the width w4 of the boss 34 at high temperatures.

That is, the width w3 is larger than w4 in the process of glass firing which is performed at a high temperature of more than 400° C. for joining the wiring board 30 to the stem 10.

By setting the widths w3 and w4 such that w3≦w4 at an upper limit of the operating temperature range, the pin 80 is fixedly attached to the wiring board 30 at the same time when the wiring board 30 is joined to the stem 10 by glass firing.

Thus, this embodiment provides a low-cost and simple structure, wherein the pin 80 is attached to the wiring board 30 at the same time when the ceramic wiring board 30 is joined to the stem 10 by means of glass.

Fifth Embodiment

While the sensor chip 20 and the wiring board 30 are joined to the stem 10 using glass in the foregoing embodiments, this is not a requirement and other joining methods may be used.

In the embodiments described above, a low-melting point lead glass is used for joining the sensor chip 20 and the wiring board 30 to the metal stem 10.

The firing process must be performed twice for joining the glass to the stem 10 and for joining the glass to the sensor chip 20 and the wiring board 30, as noted above. Another problem is the poor recyclability of lead glass that is used to make the melting point low.

Figure 10A:
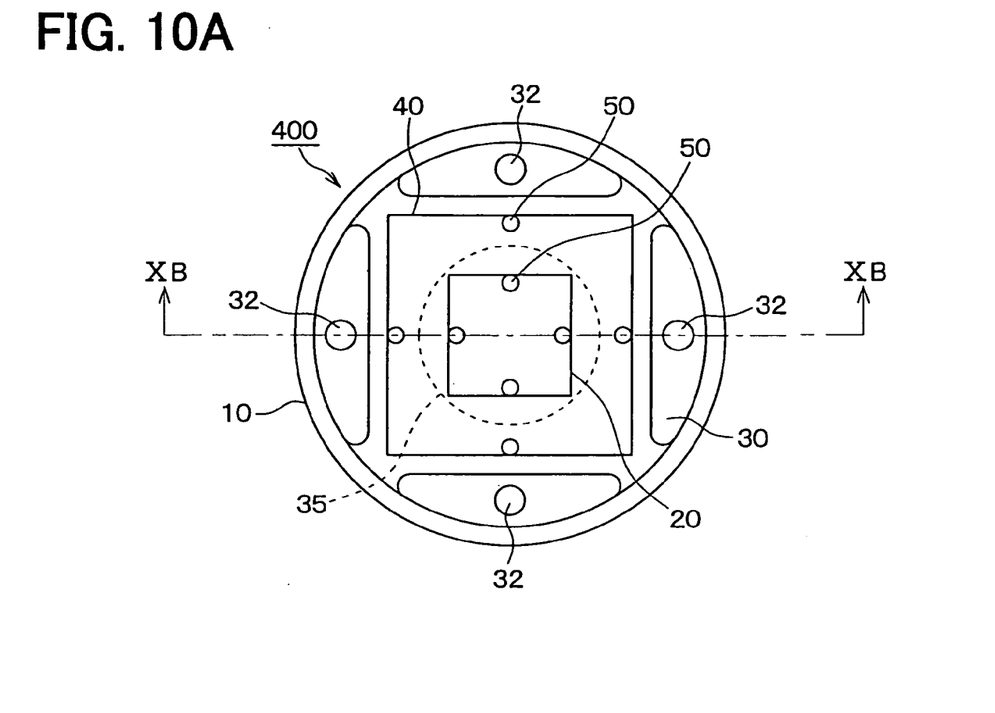
FIG. 10A is a top view of a layout of a pressure sensor according to a fifth embodiment of the present invention.
Figure 10B:
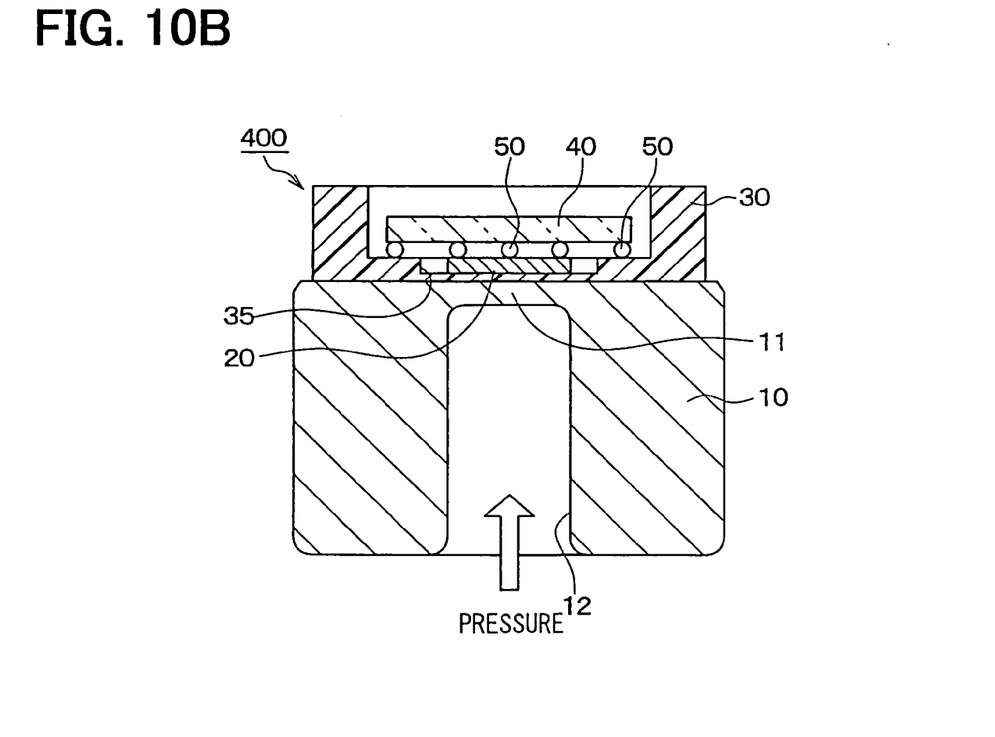
FIG. 10B is a cross-sectional side view of the pressure sensor according to the fifth embodiment of the present invention taken along line XB—XB of FIG. 10A.

FIG. 10A and FIG. 10B illustrate the structure of a fifth embodiment of the pressure sensor 400. FIG. 10A is a plan view and FIG. 10B is a cross-sectional side view taken along the line XB—XB of FIG. 10A. In FIG. 10A, the sensor chip 20 and bumps 50 are drawn by solid lines, although they do not show because of the circuit chip 40.

The pressure sensor 400 has a hollow cylindrical stem 10 with a pressure-sensitive flexible diaphragm 11 at one axial end and an opening 12 at the other axial end for transmitting pressure into the hollow part of the stem.

A sensor chip 20 provided on the diaphragm 11 of the stem 10 outputs an electrical signal in proportion to deformation of the diaphragm 11.

A wiring board 30 is provided around the sensor chip 20 on the axial end face of the stem 10 for electrically connecting the sensor chip 20 to an external circuit.

In this embodiment, the wiring board 30 is a plastic substrate made of thermoplastic resin film such as polyamide, polyimide, and epoxy resins.

Part of the wiring board 30 is interposed between the sensor chip 20 and the stem 10, as shown in FIG. 10B, so that the sensor chip 20 and the wiring board 30 are joined to the stem 10 through thermal bonding of the plastic substrate by a heat press process.

The wiring board 30 has a recess 35 in the center and fits within the outside diameter of the stem 10. The sensor chip 20 is accommodated in this recess 35.

Thus, the wiring board 30 surrounds the sensor chip 20 and rests on one axial end face of the stem 10, and part of the wiring board 30, i.e., the recess 35 is located between the sensor chip 20 and the stem 10.

While the recess 35 shown in FIG. 10A is circular, it may be square, polygonal, or any other shape that allows the sensor chip 20 to fit in. Also, the annular wiring board 30 need not necessarily be continuous, as long as it substantially surrounds the sensor chip 20.

The wiring board 30 includes lands 32 for electrical connection between the pressure sensor 400 and an external wiring member such as a circuit substrate or a bus bar (not shown). Pins 80 such as the one shown in FIG. 8 are joined to these lands 32 to connect the pressure sensor 400 to, for example, an ECU of an automobile.

Further, the wiring board 30 has peripheral side walls that stand higher than the sensor chip 20 and the circuit chip 40, so that the chips are accommodated inside the side walls.

As shown in FIG. 10A and FIG. 10B, the circuit chip 40 for processing the electrical signal from the sensor chip 20 is mounted upon the sensor chip 20 on the axial end of the stem 10, and it is electrically connected to the sensor chip 20 and to the wiring board 30 through bumps 50.

Examples of manufacturing processes of this pressure sensor 400 will be described next with reference to FIG. 11 and FIG. 12.

Figure 11:
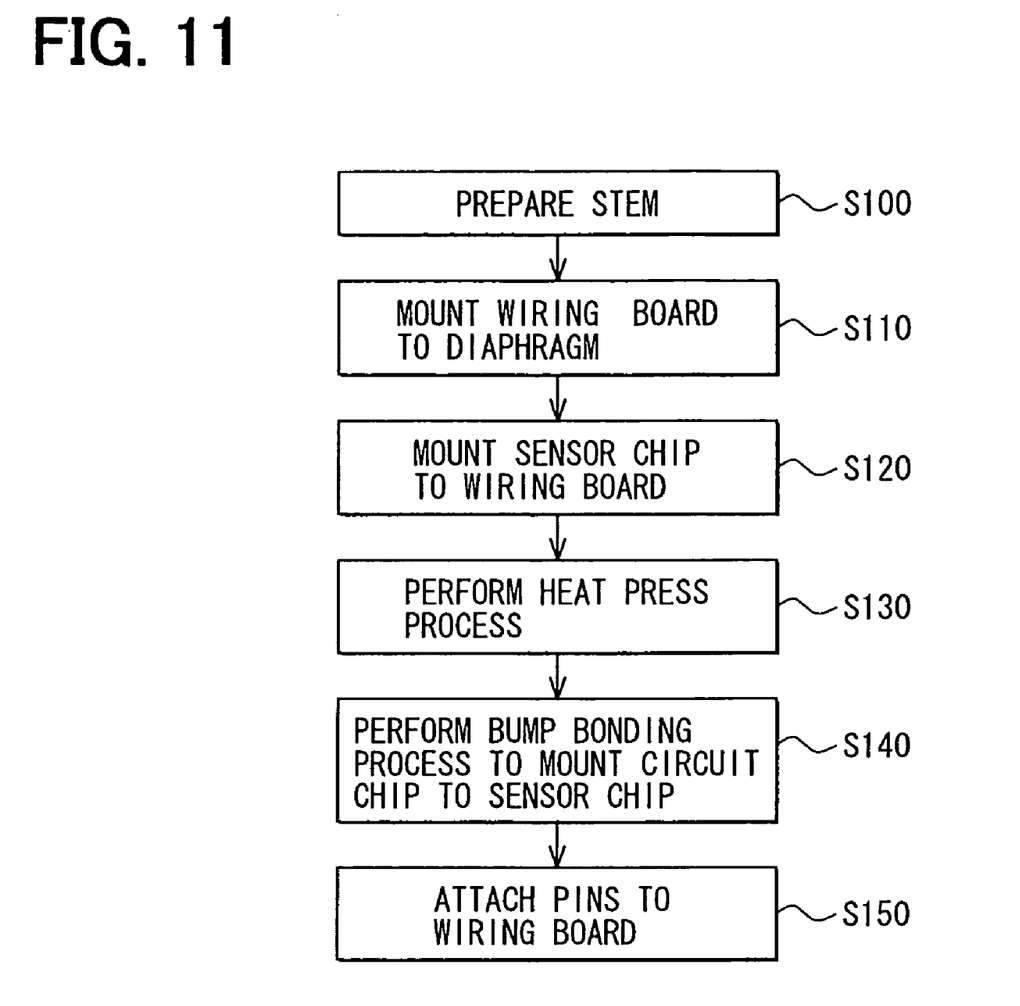
FIG. 11 is a flowchart of one example of a manufacturing process of the pressure sensor of FIG. 10.
Figure 12:
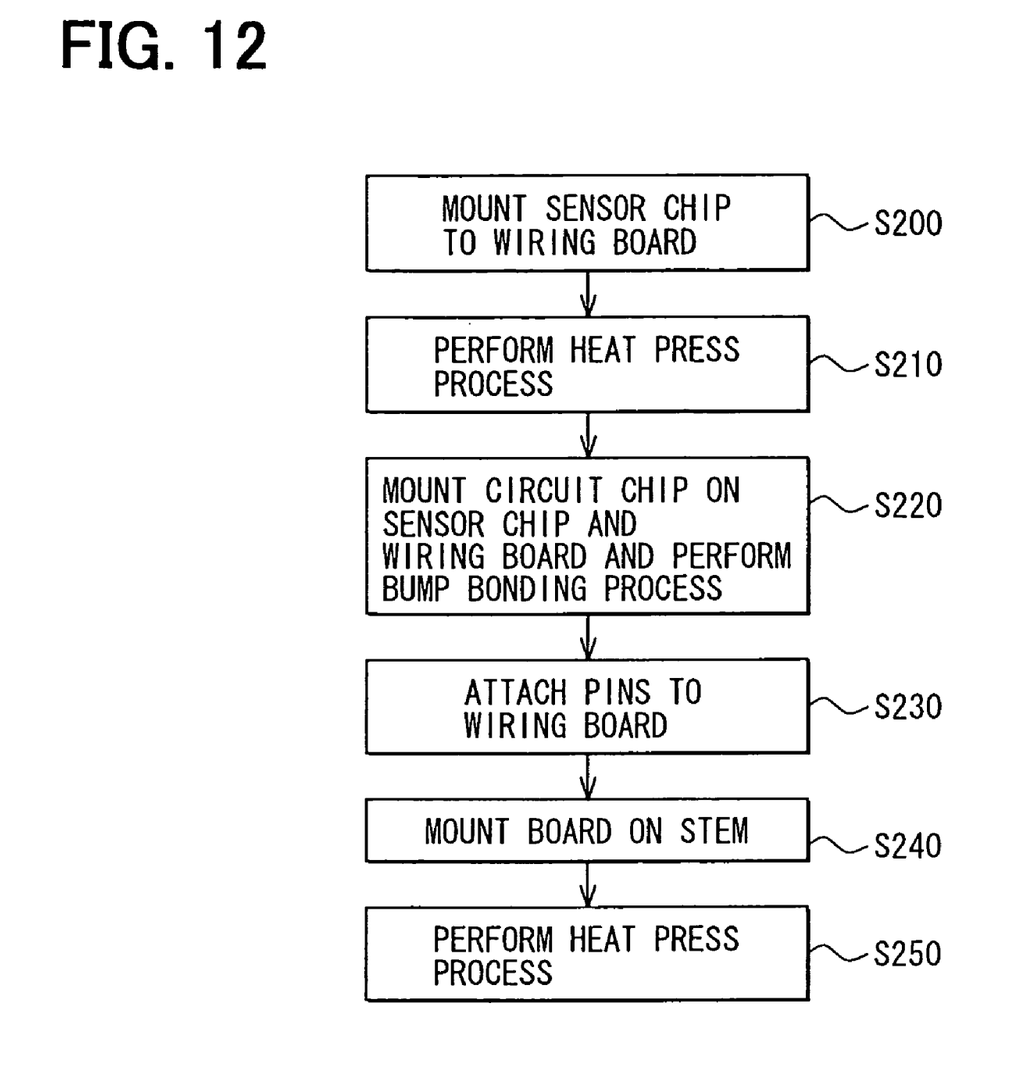
FIG. 12 is a flowchart of a second example of a manufacturing process of the pressure sensor of FIG. 10.

FIG. 11 illustrates one example of manufacturing process steps of the pressure sensor 400 according to the fifth embodiment, and FIG. 12 illustrates another example.

Referring to FIG. 11, the stem 10 is first prepared at block S100, and the plastic wiring board 30 is mounted upon the diaphragm 11 and its periphery at one axial end of the stem 10 at block S110. The sensor chip 20 is then mounted in the recess 35 of the board 30 at block S120.

This is followed by a heat press process at block S130, whereby the contact areas of the wiring board 30 are fused and joined to the sensor chip 20 and the stem 10.

The wiring board 30 and the sensor chip 20 are thus bonded to the stem 10 by thermal bonding of the plastic wiring board 30.

In a bump bonding process performed at block S140, bumps 50 are provided either to the sensor chip 20 and the wiring board 30 or to the circuit chip 40, and the circuit chip 40 is mounted on the sensor chip 20 and the wiring board 30 to be connected therewith through the bumps 50.

Then the pins 80 are attached to the wiring board 30 at block S150 by a method as with the fourth embodiment described above, to obtain the pressure sensor 400 shown in FIG. 10A.

Alternatively, the pressure sensor 400 can be produced through the processes shown in FIG. 12.

First, the sensor chip 20 is mounted in the recess 35 of the wiring board 30 at block S200, and the heat press process is performed at block S210 to join the chip 20 to the board 30 by thermal bonding.

Then the circuit chip 40 is mounted on the sensor chip 20 and the wiring board 30 for the bump bonding at block S220. The pins 80 are attached to the wiring board 30 at block S230.

Thus the components on the wiring board 30, i.e., the chips 20 and 40 and the pins 80 are assembled first, then the board 30 is mounted on the stem 10 at block S240 and the heat press process is performed at block S250.

The wiring board 30 is thus jointed to the stem 10 by thermal bonding, to complete the pressure sensor 400 shown in FIG. 10A.

The pressure sensor 400 is inserted in a tubular solenoid for driving the electromagnetic valve so that the sensor is integrally attached and connected to the electromagnetic valve for pressure detection.

This embodiment of the pressure sensor 400 uses a plastic wiring board 30, part of which is interposed between the chip 20 and the stem 10, so that the joining of the board 30 and the sensor chip 20 with the stem 10 is achieved by thermal bonding of the plastic wiring board 30.

That is, the wiring board 30 also functions as a bonding material to join itself and the sensor chip 20 with the stem 10.

A separate bonding material for joining the board 30 and the sensor chip 20 with the stem 10 is thus made unnecessary, whereby the number of components is reduced and the manufacturing process is simplified.

Moreover, this embodiment makes unnecessary the use of the low-melting point lead glass as in the foregoing embodiments. With the glass, the firing process must be performed twice for joining the stem with the glass and for joining the glass with the sensor chip 20 and the wiring board 30. With this embodiment, the manufacturing process is simplified as the bonding is achieved at one time. Further, the recyclability is improved by the omission of the lead glass.

Other Embodiments

The sensor chip 20 is not limited to the one that includes a bridge circuit and functions as a strain gauge. Any other sensor chip may be used as long as it outputs an electrical signal in proportion to deformation of the diaphragm 11.

One aspect of the pressure sensor of the invention is that it is substantially reduced in diameter, and the invention should not be limited to pressure sensors that are integrally mounted in electromagnetic valves.

Furthermore, the present invention should not be limited to pressure sensors used for detecting brake oil pressure in an automobile brake system or for detecting fuel pressure in an automobile fuel injection system.

The present invention is generally directed to pressure sensors that include a hollow cylindrical stem with a pressure-sensitive flexible diaphragm at one axial end and an opening at the other axial end for transmitting pressure into the hollow part of the stem, a sensor chip provided on the diaphragm for outputting an electrical signal in proportion to deformation of the diaphragm, and a wiring board for electrically connecting the sensor chip to an external circuit. An aspect of the invention is that the wiring board is mounted around the sensor chip on one axial end face of the stem, and various changes and modifications are possible to other features.

What is claimed is:

1. A pressure sensor comprising:
 a hollow cylindrical stem having a pressure-sensitive flexible diaphragm at a first axial end thereof and an opening at a second axial end thereof, the opening for transmitting pressure into the stem;
 a sensor chip provided on the diaphragm for outputting an electrical signal in proportion to the deformation of the diaphragm;
 a circuit chip arranged above the stem for processing the electrical signal from the sensor chip; and
 a wiring board for electrically connecting the circuit chip to an external circuit, wherein
 the wiring board is located around the sensor chip on the first axial end of the stem.

2. The pressure sensor according to claim 1, wherein the wiring board is located around the circuit chip, wherein the wiring board has a size that fits within the outside diameter of the stem.

3. The pressure sensor according to claim 1, wherein the circuit chip is mounted upon the sensor chip, and wherein the circuit chip is electrically connected to the sensor chip and to the wiring board through bumps.

4. The pressure sensor according to claim 3, wherein
 the circuit chip has a larger area dimension than the sensor chip; and
 the center of the circuit chip overlaps the sensor chip and the periphery of the circuit chip overlaps the wiring board.

5. The pressure sensor according to claim 3, wherein the sensor chip and the circuit chip mounted thereon are both square and offset from each other such that the corners of one of the chips protrude from the sides of the other of the chips.

6. The pressure sensor according to claim 3, wherein
the sensor chip and the circuit chip are both square; and
the circuit chip is connected to the sensor chip via the bump along one side thereof and the circuit chip is connected to the wiring board via the bump along the opposite side.

7. The pressure sensor according to claim 1, wherein:
the sensor chip and the circuit chip mounted thereon include pads on their opposing faces that are to be connected via the bumps;
one of the chips includes a plurality of pads corresponding to each one pad on the other of the chips; and
the plurality of pads on the one chip are arranged adjacent each other to be connected to each one pad on the other chip via the bumps.

8. The pressure sensor according to claim 1, further comprising a flexible printed circuit board interposed between the circuit chip and the sensor chip and between the circuit chip and the wiring board, wherein
the circuit chip and the flexible printed circuit board, the flexible printed circuit board and the sensor chip, and the flexible printed circuit board and the wiring board, are electrically connected through the bumps.

9. The pressure sensor according to claim 1, wherein
the wiring board is a plastic substrate; and
a part of the wiring board is interposed between the sensor chip and the stem so that the sensor chip and the wiring board are joined to the stem through thermal press bonding of the plastic substrate.

10. The pressure sensor according to claim 1, wherein the wiring board has a cylindrical wall which is smaller in diameter than the stem and accommodates both the sensor chip and the circuit chip therein.

11. A pressure sensor comprising:
a hollow cylindrical stem having a pressure-sensitive flexible diaphragm at a first axial end thereof and an opening at a second axial end thereof, the opening for transmitting pressure into the stem;
a sensor chip provided on the diaphragm for outputting an electrical signal in proportion to the deformation of the diaphragm;
a wiring board for electrically connecting the sensor chip to an external circuit, wherein the wiring board is located around the sensor chip on the first axial end of the stem; and
a circuit chip for processing the electrical signal from the sensor chip, the circuit chip being mounted upon the sensor chip, and wherein the circuit chip is electrically connected to the sensor chip and to the wiring board through bumps, wherein the circuit chip has a larger area dimension than the sensor chip, and the center of the circuit chip overlaps the sensor chip and the periphery of the circuit chip overlaps the wiring board.

* * * * *